Sept. 9, 1969 T. J. GILLIGAN ET AL 3,466,633

SYSTEM FOR DRIVING A MAGNETIC CORE MEMORY

Filed May 18, 1967 3 Sheets-Sheet 1

INVENTORS
THOMAS J. GILLIGAN
ARTHUR T. NOZAKI
BY Lindenberg & Freilich
ATTORNEYS

SYSTEM FOR DRIVING A MAGNETIC CORE MEMORY

Filed May 18, 1967

INVENTORS
THOMAS J. GILLIGAN
ARTHUR T. NOZAKI
BY Lindenberg & Freilich
ATTORNEYS

SYSTEM FOR DRIVING A MAGNETIC CORE MEMORY

Filed May 18, 1967 3 Sheets-Sheet 3

INVENTORS
THOMAS J. GILLIGAN
ARTHUR T. NOZAKI
BY Lindenberg & Freilich
ATTORNEYS United States Patent Office 3,466,633

Patented Sept. 9, 1969

3,466,633

SYSTEM FOR DRIVING A MAGNETIC CORE MEMORY

Thomas J. Gilligan, Pales Verdes Estates, and Arthur T. Nozaki, Torrance, Calif., assignors to Electronic Memories, Inc., Hawthorne, Calif., a corporation of California Filed May 18, 1967, Ser. No. 639,406

Int. Cl. G11b 5/00

U.S. Cl. 340—174 8 Claims

ABSTRACT OF THE DISCLOSURE

This invention is directed to an improved arrangement for selecting and driving a predetermined number of magnetic cores in a magnetic core memory for the purpose of storing information in those magnetic cores or for the purpose of reading the information which has been stored in those magnetic cores. By the judicious placement of switches and by the interconnection of magnetic core matrices, the number of switches required for magnetic core selection is reduced, and also by the interconnection of these switches, the current used to drive the cores for reading or writing is made to re-enter the matrices whereby power requirements are minimized.

BACKGROUND OF THE INVENTION

Various arrangements have been proposed for magnetic core memories. Basically, the magnetic cores in a memory are arranged in an array of columns and rows. A large number of these arrays are used. Each array may be designated also as a core plane. For the purpose of addressing these magnetic memory arrays, a number of different schemes have been proposed variously designated as four-wire coincident current systems, cubic or 3–D coincident current systems, and planar or 2–D linear select systems. The most recent favored for magnetic core memories is a system known as the "2½–D system." An article describing in detail the 2½–D magnetic core memory system may be found in the IEEE Transactions on Electronic Computers, which was published in August 1966, page 475, which is entitled "2½–D High Speed Memory Systems—Past, Present and Future," by Thomas J. Gilligan.

The 2½–D memory system usually comprises a number of core planes which are placed in the same plane to provide a planar array. X and Y windings are employed for enabling coincident current excitation of selected cores in the planar array. Usually a plurality of these planar arrays are employed and each planar array has its own set of selecting and driving switches.

SUMMARY OF THE INVENTION

A number of planar arrays, which heretofore have been driven separately are connected together and are connected to selecting and driving switches in a manner so that, by way of illustration, one can write simultaneously in a plurality of these planar arrays and one can read simultaneously from a plurality of these planar arrays, using less of the switching and selecting hardware than is presently used. By way of example, and in accordance with this invention, four planar arrays are combined. The X selection of cores (word line) is done as heretofore, by energizing the selected ones of the X lines which pass through all the cores in a given column of cores. One end of a Y winding which passes through each row of cores in an array is connected to a common bus. For the four arrays selected, by way of example, these are disposed in square arrangement and the common busses of each two of these arrays are connected together. One end of each of these busses is connected to a switch arrangement, designated as a sink switch.

The other end of each of the row or Y windings terminates in the junction between two diodes which are oppositely poled relative to such junction. The other ends of the two diodes are connected to the output electrodes of two respective transistors which may be considered as drive or current switches. Thus, in order to apply current to a selected row in each one of the four arrays, for the purpose of writing, one of the sink switches is energized to allow a current flow therethrough in one direction, while the other sink switch is energized to allow a current flow therethrough in the opposite direction. Simultaneously therewith, the two current switches which are connected to two diodes which are connected to the winding passing through a desired row of cores are enabled. There will then be a current flow from one of the sink switches up the bus connected to one end of the selected row of cores, through one of the diodes and the transistor connected thereto, then through a current source and then back through the other transistor across to a diode connected in a similarly positioned row in another array, and then down to return to the other sink switch. By enabling the two transistors connected to the diode connected to the winding coupled to a similarly positioned row of cores in each of the other core arrays, current flow also occurs through these core arrays from the same sink switches as supply the previously described rows of cores. By reversing the current flow through the sink switches to the current flow direction just described, one can perform the opposite function to the one just described. That is, if current flow through a row of cores in one direction, assisted by selective excitation of the X windings causes write in of data into the respective rows of cores, the reverse current flow from the current switches can be used in well known manner to secure readout of the data in the selected cores.

There are also provided transistor switches which are connected to the drive switches and which can be enabled to selectively block current flow through certain ones of the current switches whereby only certain ones of the row windings which were previously energized, may be permitted to have a current flow therethrough.

DESCRIPTION OF THE PREFERRED EMBODIMENTS

Figure 1:
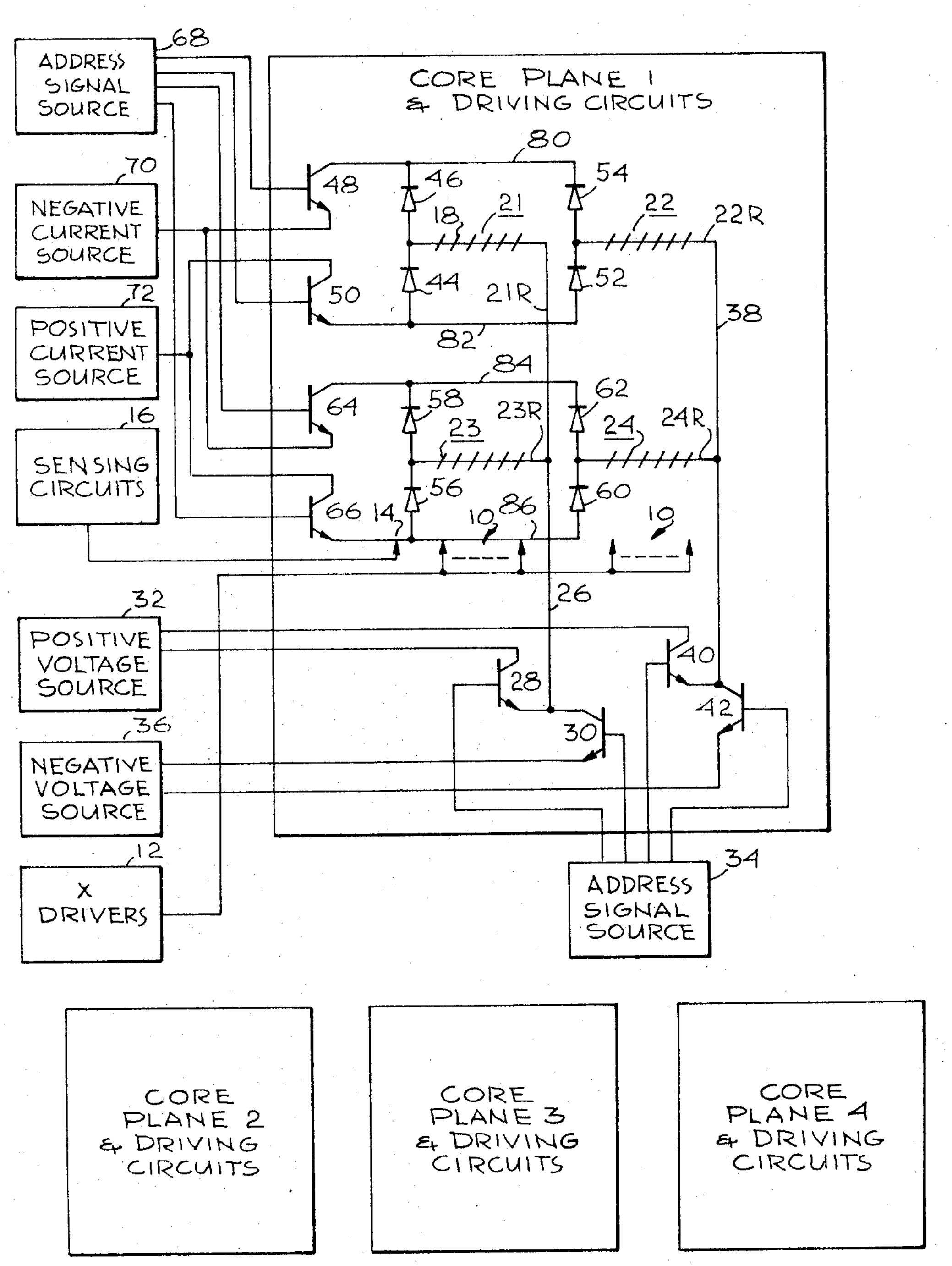
FIGURE 1 is a block schematic drawing illustrating the presently used drive system for a 2½–D magnetic core memory shown to provide a better appreciation and understanding of this invention.

The block schematic arrangement of FIGURE 1 represents four core plane arrays, the details of only one of these being shown. It will be appreciated that the others are identical with the one which will be described in detail. Also, in order to reduce the complications of the drawing and the explanation, each core plane will have only four rows of cores, but those skilled in the art will readily appreciate how the teachings of this invention may be extended to very much larger core planes, and thus this should not be construed as a limitation upon the invention. Also, the use of four core planes is to be understood to be by way of example only, and not to be construed as a limitation upon the invention, since those skilled in the art will also understand, from the description that follows how this invention may be extended to work with a greater number of core planes than four. The arrangement shown in FIGURE 1 is in accordance with the present day practice with 2½–D memories.

In FIGURE 1, the X or word windings 10 are represented vestigially. Each X winding is inductively coupled to a column of cores and the energization of each X winding is provided selectively by the X drivers 12. The structure and function of these X windings and their driving circuitry is well known and is found described, for example, in the article by this inventor, as indicated above. Also, the sensing winding 14 used for reading is shown vestigially. The sensing winding function and structure is also well known in this art. Sensing circuit 16 determines whether a binary "0" or a binary "1" bit is read. Each core in FIGURE 1 is represented by a transverse line, such as 18, which intersects a row winding, such as 21R. The four rows of cores are respectively designated as 21, 22, 23 and 24. The row winding for row 22 is designated by a reference numeral 22R. The row winding for row 23 is designated by reference numeral 23R. The row winding 24R threads through the row of cores in row 24.

One end of each row winding 21R, 23R is connected to a common bus 26, which in turn is connected to sink switch structure. This includes a transistor 28 and a transistor 30. Transistor 28 has its collector connected to a positive voltage source 32, its emitter connected to the collector of transistor 30, and its base connected to an address signal source 34. Transistor 30 has its emitter connected to a negative voltage source 36 and its base connected to an address signal source 34. The bus 26 is connected to the junction of the emitter of transistor 28 and the collector of transistor 30.

One end of each of the row windings 22R and 24R is connected to a bus 38. The bus is connected to a sink switch comprising two transistors respectively 40, 42. Both the bus 38 and emitter of transistor 40 are connected to the collector of transistor 42. The collector of transistor 40 is connected to the positive voltage source 32, its base is connected to the address signal source 34. The emitter of transistor 42 is connected to the negative voltage source 36 and its base is connected to the address signal source 34.

The other end of row winding 21R is connected to two oppositely poled diodes respectively 44 and 46. Diode 46 is connected to the collector of a transistor 48, which may be designated as one of the current switch transistors. Diode 44 has its other end connected to the emitter of transistor 50. The row winding 22R has its other end connected to oppositely poled diodes respectively 52 and 54. The other ends of these respective diodes are also connected respectively to the emitter of transistor 50 and the collector of transistor 48. Row winding 23R has its other end connected to the oppositely poled diodes 56, 58, and the other end of row winding 24R is connected to oppositely poled diodes 60, 62. Diodes 58 and 62 are collected to the collector of a current switch transistor 64 and diodes 56 and 60 are connected to the emitter of a current switch transistor 66.

The bases of current switch transistors 48, 50, 64, and 66, are all connected to an address signal source 68. The emitter of transistor 48 and the emitter of transistor 64 are both connected to a negative current source 70. The collector of transistor 50 and the collector of transistor 66 are both connected to a positive current source 72.

The structure described thus far for the core plane is effectively duplicated for the other four core planes except for the address signal sources 68 and 34 which are common to the four core planes. Each one of the core planes stores a bit in a four-bit word. In order to write into the core plane they are driven simultaneously. A coincident current drive is employed. A similarly positioned row in each core plane has current applied to its row winding by the proper selection of the drive switch transistor and sink switch transistor. This applies approximately one-half of the drive required for transferring the cores in the row to their one state. The other half of the required drive is provided by exciting one of the X windings with the other half of the required current, the X winding selected being the one which intersects with the core in the row having the excited row winding. This coincident current excitation of cores for the purpose of writing and also for the purpose of reading and sensing is well known and therefore will not be further discussed here.

Figure 2A:
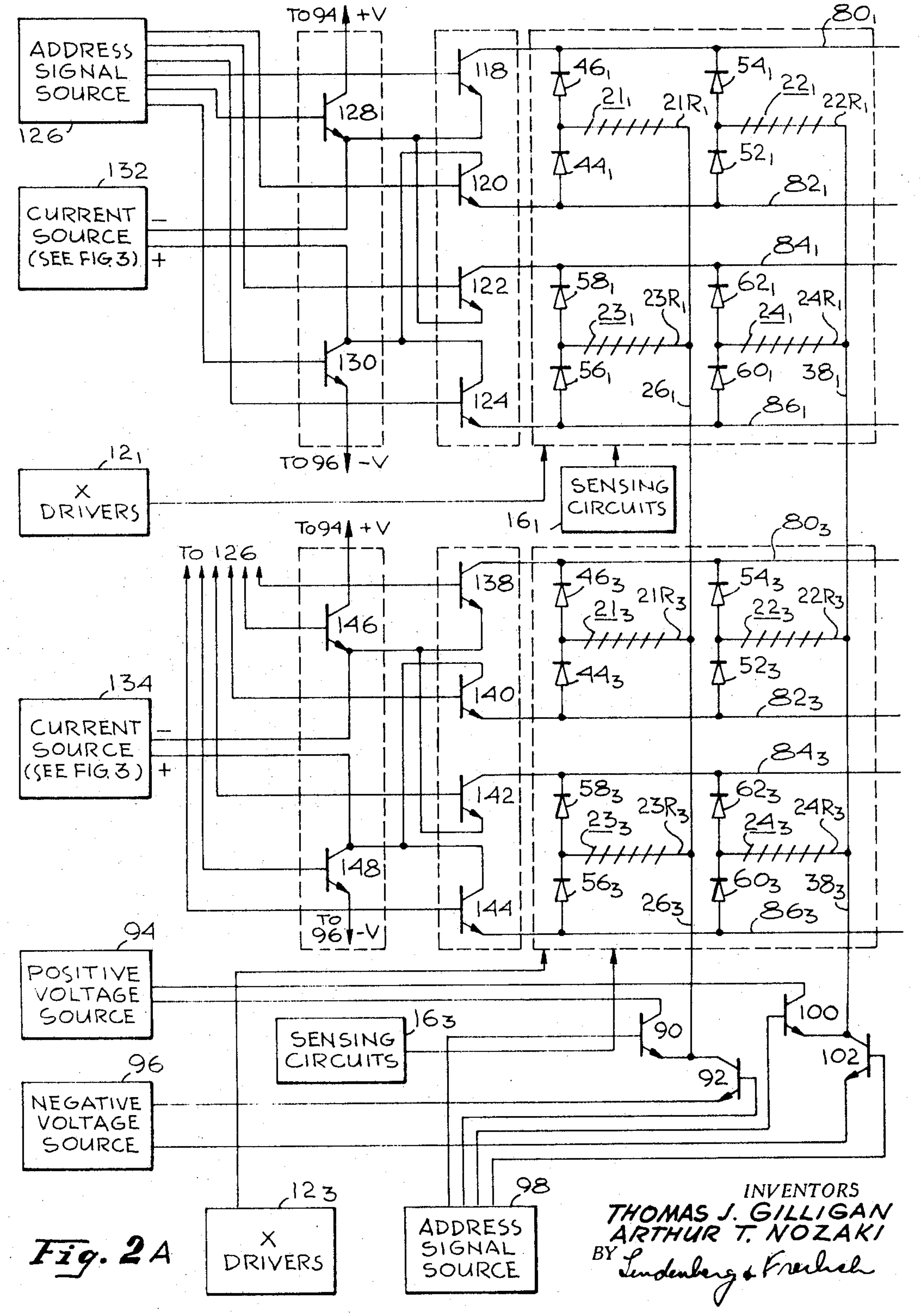
FIGURES 2*a* and 2*b* are are block schematic drawings illustrating a drive scheme for a 2½–D memory in accordance with this invention.

For the purpose of better illustrating the difference between the conventional drive scheme shown in FIGURE 1 and that shown in FIGURE 2, which is an embodiment of the invention, a description of a selection of a row winding in the structure shown in FIGURE 1, for excitation for the purpose of reading and for excitation for the purpose of writing will be provided. Assume that it is desired to read the information stored in row 21 of each of the core planes. The address signal sources 34 and 68 will apply a signal to the bases of transistors 30 and 50 in each of the four core planes whereby current can flow from the positive current source 72 in a path which includes the collector and the emitter of transistor 50, diode 44, row winding 21R, collector to emitter of transistor 30 and back to the negative voltage source 36 for each of the four core planes.

Assume it is desired to write into row 21, then the address signal sources 34 and 68 apply enabling signals to the bases of the corresponding transistors 28 and 48. Thereby, current can flow in a path from positive voltage source 32 through the collector and emitter of transistor 28, up the bus 26, through row winding 21R, diode 46, collector to emitter of transistor 48 and finally to the negative current source 70. This current flows in a direction which is the reverse of the reading current. It should be appreciated that the operation described is repeated for each of the core planes, (here 1, 2, 3 and 4).

FIGURE 2 is a block schematic drawing of an embodiment of the invention. Similar functioning parts in FIGURE 2 to those shown in FIGURE 1 are given similar reference numerals, however, a subscript is appended thereto to show in which one of the four core planes the part, to which the subscript is appended, is located.

As far as the core planes themselves are concerned, their windings and diodes which are associated with each row of cores remain the same. However, in accordance with this invention, bus line $\mathbf{26}_1$ is connected to $\mathbf{26}_3$. Bus line $\mathbf{26}_2$ is connected to bus line $\mathbf{26}_4$. Bus line $\mathbf{38}_1$ is connected to $\mathbf{38}_3$, and bus line $\mathbf{38}_2$ is connected to $\mathbf{38}_4$. Also, the lines 80, 82, 84 and 86, which, in FIGURE 1, connect the diodes at the end of each row winding to the respective drive switch transistors respectively 48, 50, 64 and 66, are now connected in parallel. In short, the bus lines of the respective core planes are now connected in parallel. As a result of this parallel connection, instead of using two sink switches per core plane as is shown in FIGURE 1, the conventional drive scheme, only four sink switches need be used for the four core planes. Further, instead of using four drive switches for each one of the four core planes or a total of 16, only eight drive switches need be used.

Sink switches which include transistors 90, 92, are connected to each other, and to the common bus 263 in similar fashion as were the sink switches 28 and 30 in FIGURE 1. The collector of transistor 90 is connected to a positive voltage source 94, and the emitter of transistor 92 is connected to a negative voltage source 96. The base of transistor 92 is connected to the address signal source 98 as is the base of transistor 90. Thus, the transistors and associated apparatus which comprises the sink switches are identically connected as those shown in FIGURE 1. However, they must be capable of carrying, for the embodiment of the invention shown, two times the current carried by the sink switch shown in FIGURE 1.

The bus $\mathbf{38_3}$ is connected to another sink switch comprised of transistors 100, 102, which are connected in similar fashion as the transistors 40 and 42 shown in FIGURE 1. A second pair of sink switches is comprised of the respective transistors 104 and 106 and 108, 110. The collectors of transistors 104 and 108 are connected to a positive voltage source 94. The emitters of transistors 106 and 110 are connected to a negative voltage source 96. The bases of transistors 104 and 106, 108, and 110 are connected to the address signal source 98. The emitter of transistor 104 is connected to the collector of transistor 106 and to the bus line $\mathbf{26_4}$. The emitter of transistor 108 is connected to the collector of transistor 110 and to the bus line $\mathbf{38_4}$.

The current switches for core planes 1 and 2 comprise transistors 118, 120, 122, and 124. The collector of transistor 118 is connected to the connected together buses $\mathbf{80_1}$ and $\mathbf{80_2}$. The emitter of transistor 120 is connected to the connected together buses $\mathbf{82_1}$ and $\mathbf{82_2}$. The collector of transistor 122 is connected to the connected together buses $\mathbf{84_1}$ and $\mathbf{84_2}$ and the emitter of transistor 124 is connected to the connected together buses $\mathbf{86_1}$ and $\mathbf{86_2}$. The bases of transistors 118, 120, 122 and 124, are all connected to an address signal source 126. The emitters of transistors 118 and 122 are connected to the emitter of a data or address transistor 128, and also to a current source 132. The current source 132 is connected to the collector of transistor 130. The collectors of transistors 120 and 124 are connected to the collector of transistor 130 for address or data insertion. Transistors 128 and 130 have their bases connected to the address or data input signal source 126. The collector of transistor 128 is connected to the positive voltage source 94 and the emitter of transistor 130 is connected to the negative voltage source 96.

The second required current switches for core planes 3 and 4 include transistors 138, 140, 142 and 144. Transistor 138 has its collector connected to the connected together buses $\mathbf{80_3}$, $\mathbf{80_4}$. Transistor 140 has its emitter connected to the connected together buses $\mathbf{82_3}$ and $\mathbf{82_4}$. Transistor 142 has its collector connected to the connected together buses $\mathbf{84_3}$ and $\mathbf{84_4}$. Transistor 144 has its emitter connected to the connected together buses $\mathbf{86_3}$ and $\mathbf{86_4}$. The emitter of transistors 138 and 142 are connected together and to the emitter of a transistor 146. The emitter of transistor 146 is connected to a current source 134 which is also connected to the collector of a transistor 148. The collector of transistor 148 is also connected to the collectors of transistors 140 and 144. The bases of transistors 138, 140, 142 and 144 as well as the bases of transistors 146 and 148 are all connected to the address or data signal source 126. The collector of transistor 146 is connected to the positive voltage source 94 and the emitter of transistor 148 is connected to the negative voltage source 96.

Assume that it is desired to operate the arrangement shown in FIGURE 2 for the purpose of writing in rows $\mathbf{21_1}$, through $\mathbf{21_4}$. The address signal source 98 applies energizing signals to the bases of transistors 90 and 106. The address signal source 126 applies energizing signals to the bases of transistors 118 and 120, 138 and 140. Accordingly, current will flow from the positive voltage source 94 through the collector to emitter of transistor 90, up through the bus $\mathbf{26_3}$. Part of the current will flow through row winding $\mathbf{21_3}$, then through diode $\mathbf{46_3}$. The current will continue to flow through the collector-emitter path of transistor 138, then through the current source 134. Current then flows through the collector-emitter path of transistor 140. The current continues to flow along bus $\mathbf{82_3}$ from core plane 3 to core plane 4 where it will flow through diode $\mathbf{44_4}$ and then through row winding $\mathbf{21_4}$ down through the bus $\mathbf{26_4}$ and back to the negative current source 96, by way of the collector-emitter path of transistor 106.

Another current portion can flow from transistor 90, flows up through buses $\mathbf{26_3}$ and $\mathbf{26_1}$ and then through row winding $\mathbf{21_1}$ by way of diode $\mathbf{46_1}$ and the collector-emitter path of transistor 118 through the current source 132 and then back up to the bus $\mathbf{82_1}$ by way of the collector-emitter path through transistor 120. From the bus $\mathbf{82_1}$ the current continues to flow to core plane 2 where it passes through diode $\mathbf{44_2}$, row winding $\mathbf{21R_2}$ and then down to buses $\mathbf{26_2}$ and $\mathbf{26_4}$ to the negative voltage source 96, by way of the collector-emitter path of transistor 106.

From the foregoing description it is seen that current is supplied to four row windings similarly disposed in each one of the four matrices, simultaneously, using two sink switches and causing the current to re-enter the matrices by using four of the transistors in the two current switches instead of the one of the sink switches and drive switches as was used heretofore. It will be understood that the respective X drivers $\mathbf{12_1}$, $\mathbf{12_2}$, $\mathbf{12_3}$ and $\mathbf{12_4}$ address the X windings for the purpose of writing or reading, as the case may be, in the manner that they were used similarly before.

For the purpose of reversing the current through the row windings in order to obtain a reading operation, the address signal source 98 now energizes transistors 92 and 104, and the address signal source 126 energizes the same transistors as before, namely 118 and 120, 138 and 140. This time the current flow commences with transistor 104 which is connected to the positive current source and then out through the bus $\mathbf{26_4}$ to the row $\mathbf{21_4}$ where the current divides with a part flowing through the winding $\mathbf{21R_4}$ and the other part flowing through the row winding $\mathbf{21R_2}$. The current that flows through winding $\mathbf{21R_4}$ then flows through diode $\mathbf{46_4}$, and then over bus $\mathbf{80_3}$ through the collector-emitter path of transistor 138 then through current source 134, and then around through the collector-emitter path of transistor 140, up through the diode $\mathbf{44_3}$ and thence through the row winding $\mathbf{21R_3}$, then down to the negative voltage source 96 by way of the collector-emitter path through transistor 92.

Another portion of the current flows through the row winding $\mathbf{21R_2}$, then through diode $\mathbf{46_2}$ along the bus $\mathbf{80_2}$, down through the collector-emitter path of transistor 118, then through current source 132 and then up through the collector-emitter path of transistor 120, then up through the diode $\mathbf{44_1}$, then through the row winding $\mathbf{21R_1}$ and thence back down through the collector-emitter path of transistor 92 to the negative voltage source 96.

Thus, a reverse current flow may be provided through the respective row windings $\mathbf{21R_1}$, $\mathbf{21R_2}$, $\mathbf{21R_3}$, and $\mathbf{21R_4}$, as is required for the purpose of reading.

The function of the transistors 128, 130, 146 and 148, is to enable the selective write or restrore of information to the four matrices, if desired. Thus, for example, if the address signals source 126 applies a signal to the base of transistor 128 to render it conductive then it will draw the current intended for transistors 118 and 122, thereby preventing current flow in row windings 21R or 22R by effectively blocking transistors 118 and 122. Similarly transistor 146 may be energized to block current flow through transistors 138 and 142. Energization of transistor 130 prevents current flow through transistors 120 and 124. Energization of transistor 148 prevents current flow through transistors 140 and 144.

By properly addressing the transistors 128, 130, 146, 148 in conjunction with the sink and drive switches, one is enabled to drive the core matrices in a non-reentrant mode. When they are not addressed the core matrices may be driven in a reentrant mode. Thus, if one wishes to excite only row winding $21_2$ sink switch transistor 106 is energized, drive switch 120 and transistor 128. If one wishes to excite only row winding $21_1$, then sink switch transistor 90 is excited, transistor 118, and transistor 130. The operation of the circuits used for driving the other row windings should be apparent from the foregoing.

Accordingly, the four transistors 128, 130, 146 and 148, provide a flexibility to the driving circuits, whereby, in addition to being able to read or write simultaneously into two or four rows of cores, in two or four core planes one can read and write in the individual core planes.

Figures 2B, 3, 4:
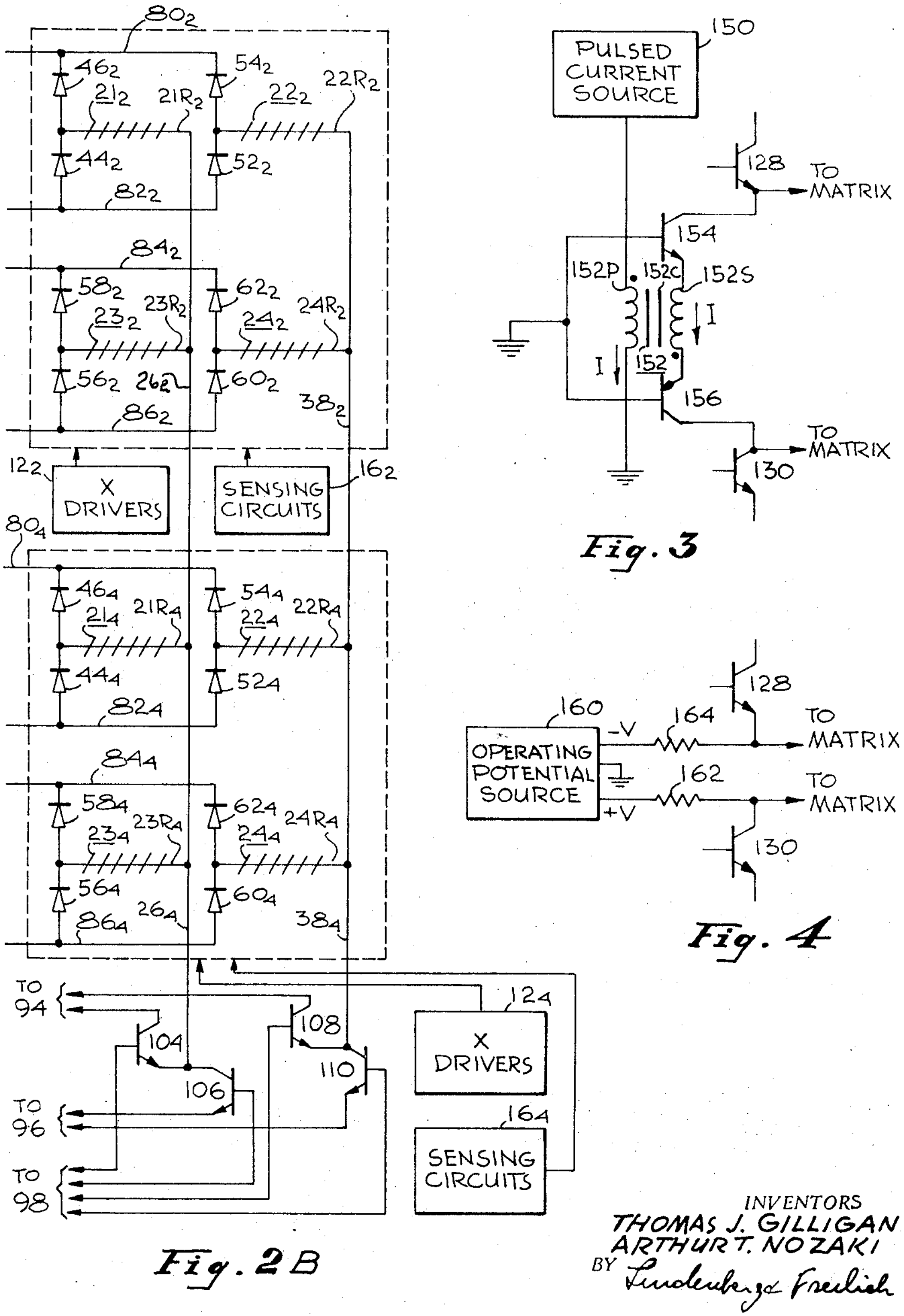
FIGURES 3 and 4 are circuit diagrams of current sources suitable for use with the embodiment of the invention.

FIGURE 3 is a circuit diagram of a constant current source suitable for use where it is desired to operate the core plane arrays in both reentrant and non-reentrant current drive modes. A pulsed current source 150, (or source of current pulses) is connected to the primary winding 152P of a transformer 152, having a saturable core 152C. A first transistor 154 has its emitter connected to one end of the transformer secondary winding 152, its base connected to ground and its collector connected to the emitter of transistor 128. A second transistor 156 has its emitter connected to the other end of the secondary winding 152S, its base connected to ground and its collector connected to the collector of transistor 130.

In operation, the amount of current flowing through the secondary winding determines the saturation of the core 152C. When the core is fully saturated, no current contribution is required or provided by the primary winding. When the core is not fully saturated there is a transfer of voltage from the primary to the secondary winding which raises the current flow out of the secondary winding until the core is saturated again.

Where a non-reentrant current type of operation is desired for the embodiment of the invention, a simpler current source may be employed as shown in FIGURE 4. Here a source of operating potential 160 provide voltages +V and −V through resistors respectively 162, 164 to the respective emitters of transistors 136, 128. To enable the source 160 to appear as a constant current source resistors 162 and 164 have values on the order of 2V where V is the desired constant current value and V is the available voltage (+V or −V).

The foregoing invention accordingly provides the ability to drive a selected winding, or windings in a plurality of matrices with fewer circuit components and drive currents normally used to access the same plurality of matrices.

One can extend the number of matrices from the number shown to any number by adding a set of current switches for additional matrices, which are added vertically to the array shown in the drawing.

From the foregoing explanation, those skilled in the art will readily appreciate how the drive system of this invention may be employed with 3D systems. Accordingly, the foregoing explanation of the invention in connection with 2D systems should be considered as exemplary rather than as limiting.

What is claimed is:

1. Apparatus for selectively directing current through row windings of a plurality of identical magnetic core arrays, each array including;

a plurality of magnetic cores arranged in columns and rows, there being a row winding for each row of cores which is inductively coupled to each of the cores in its row;

bus means for each array connecting together one end of all of the row windings in each array of said plurality of magnetic core arrays;

a separate sink switch means connected to each of said bus means;

a first potential source having one polarity, a second potential source having polarity opposite to said one polarity, a first and a second drive switch means in each array for each one of said row windings;

first diode means in each array connecting each first drive switch means to the other end of each row winding for unilateral current flow in one direction;

second diode means in each array connecting each second drive switch means to said other end of each row winding for unilateral current flow in a direction opposite to said one direction;

a current source having a first and a second current source terminal for each array;

means in each array connecting all of said first drive switch means in each array to its first current source terminal;

means in each array connecting all of said second drive switch means in each array to its second current source terminal;

address means for enabling current flow through selected ones of the row windings in said magnetic core arrays, said address means including first means for connecting to said first potential source the one of said sink switch means connected to the bus means of one array which is connected to selected ones of said row windings, second means for connecting, together with said first switch means, another of said sink switch means to said second potential source which is connected to the bus means of another array which is connected to selected ones of said row windings, and means for enabling together a first and second drive switch means in each array which are connected to the first and second diode means which are connected to said selected ones of said row windings.

2. Apparatus for selectively directing current through the row windings of a plurality of magnetic core arrays, each array including a plurality of magnetic cores arranged in columns and rows, there being a row winding for each row of cores which is inductively coupled to each core in said row, said arrays of cores being disposed adjacent one another, said apparatus comprising:

first switch means at one side of said arrays of cores applying voltage to a first end of a selected first plurality of row windings in said plurality of magnetic core arrays;

second switch means at another side of said magnetic core arrays for determining through which of said first plurality of row windings current will be permitted to flow;

third switch means coupled to said second switch means for redirecting current flowing thereto from a row winding of one of said magnetic core arrays, to another of said magnetic core arrays; and fourth switch means connected to said first ends of the row windings in said plurality of magnetic core arrays for determining the row windings in said another of said magnetic core arrays through which said redirected current will flow.

3. A system for selectively applying current to a row winding in each of a plurality of magnetic core planes wherein said core planes are made up of a plurality of cores arranged in columns and rows, there being provided a separate row winding for each row of cores, which is inductively coupled to all the cores in said row, said system comprising:

a first voltage source;

a second voltage source;

said first voltage source having a polarity opposite relative to said second voltage source;

first switch means for applying, when enabled, voltage from said first voltage source to one end of some of the row windings in some of the plurality of magnetic core planes;

a plurality of second switch means, there being at least one second switch means for all of the similarly disposed rows of cores in said plurality of magnetic core planes;

means coupling each of said second switch means to the other end of each similarly disposed row winding of cores in said plurality of magnetic core planes;

a plurality of third switch means, there being at least one third switch means for all of the similarly disposed rows of cores in said plurality of magnetic core planes;

means for energizing predetermined ones of said second switch means to enable current flow through selected row windings in some of said core planes as a result of voltage applied by said first switch means to the other ends of said some of the row windings;

means including said third switch means for redirecting the current flowing through said second switch means to one end of similarly disposed row windings in the remaining ones of said plurality of core planes;

fourth switch means for selectively connecting when enabled the other ends of all of the row windings in said remaining ones of said plurality of core planes to said second voltage source.

4. A system as recited in claim 3 wherein said first switch means includes first and second transistors and said fourth switch means includes third and fourth transistors, each of said transistors having an emitter a base and collector electrode;

means connecting said first and third transistor collectors to said one first voltage source;

means connecting the emitter of said first transistor to the collector of said second transistor;

means connecting the emitter of said third transistor to the collector of said fourth transistor;

means connecting the emitters of said second and fourth transistors to said second voltage source;

means connecting one end of some of the row windings on some of said plurality of core planes to the connection between the emitter and collector of said first and second transistors;

means connecting one end of the remainder of said plurality of row windings to the connection between the emitter and collector of said third and fourth transistors;

address signal means to which the bases of said first, second, third and fourth transistors are connected for enabling said first and fourth transistors to provide current flow in one direction to the ones of said rows of cores which are connected to enabled second and third switch means; and for enabling said second and third transistors for causing a current flow in a direction in reverse to that caused when said first and fourth transistors are enabled.

5. An arrangement for selectively directing current to flow through the row windings of a plurality of planes of magnetic cores each having a plurality of rows of cores, each row of cores being coupled to a different one of said row windings, and wherein the cores of each of said planes are all coupled to a common sense winding unique to that plane, said arrangement comprising:

first means connecting together one end of the row windings in some of said core planes;

second means connecting together one end of the row windings in the remaining ones of said plurality of core planes;

a source of one polarity voltage positive;

a source of voltage of polarity opposite to said one polarity;

first switch means having a first state at which it is connected to said one polarity voltage source, and a second state at which it is connected to said opposite polarity voltage source, and a third state at which it is connected to neither voltage source;

means connecting said first switch means to said first means for connecting the ends of said row windings of said some of said planes together;

a second switch means having three states including a first state in which it is connected to the one of the two voltage sources opposite to the one to which said first switch means is connected when in its first state, a second state in which it is connected to the one of the two voltage sources opposite to the one to which said first switch means is connected in its second state position, and a third state in which it is connected to neither voltage source;

means connecting said second switch means to said second means for connecting the ends of said row windings of said remaining ones of said planes together;

a plurality of first and second diode means, there being a first diode means and a second diode means for each one of the row windings in said plurality of magnetic core planes;

means connecting to the other end of each row winding one of said plurality of first diode means;

means connecting to the other end of each row winding one of said second diode means with a polarity opposite to the polarity of the connection of said first diode means;

a plurality of third connecting means, each of said third connecting means connecting together the first diode means which are connected to the row windings coupled to aligned rows of cores in said plurality of magnetic core planes;

a plurality of fourth connecting means each of said fourth connecting means connecting together said second diode means which are connected to row windings coupled to aligned rows of cores in said plurality of magnetic core planes;

a third switch means for each third connecting means;

a fourth switch means for each fourth connecting means;

means connecting each fourth switch means to each fourth connecting means; and means for operating together a third and fourth switch means selectively in conjunction with a first and second switch means for enabling current to flow through selected rows of cores.

6. Apparatus as recited in claim 5 wherein each said third and fourth switch means comprises:

a transistor having a collector, base and emitter, the collector of said third switch means transistor being connected to a third connecting means, the emitter of each fourth switch means transistor being connected to a fourth connecting means;

current source means to which said third and fourth connecting means are connected; and means connecting the bases of all said third and fourth switch transistors to said means for operating them.

7. Apparatus as recited in claim 5 wherein there is included a fifth switch means for diverting current when energized from each of said plurality of fourth switch means; and a sixth switch means for diverting current when energized from each of said plurality of third switch means.

8. Apparatus as recited in claim 7 wherein each said fifth and sixth means comprises:

a transistor having collector, emitter and base electrodes;

said fifth switch means transistor having its collector connected to the voltage source of one polarity and its emitter connected to the collectors of all of said plurality of fourth switch means transistors;

said sixth switch means transistor having its collector connected to the emitters of all of said plurality of third switch means transistor emitters and its collector connected to the opposite polarity voltage source, and the bases of said fifth and sixth switch means transistors being connected to said address or data signal source.

References Cited

UNITED STATES PATENTS

| | | | |
|---|---|---|---|
| 3,154,763 | 10/1964 | Bornhauser | 340—174 |
| 3,164,810 | 1/1965 | Harding | 340—174 |
| 3,229,266 | 1/1966 | Rajchman | 340—174 |
| 3,351,924 | 11/1967 | Meyerhoff et al. | 340—174 |

BERNARD KONICK, Primary Examiner

K. E. KROSIN, Assistant Examiner